US012532812B2

(12) United States Patent
Nona et al.

(10) Patent No.: US 12,532,812 B2
(45) Date of Patent: Jan. 27, 2026

(54) METHOD FOR DETERMINING A QUALITY OF AN AGRICULTURAL BALE

(71) Applicant: CNH Industrial America LLC, New Holland, PA (US)

(72) Inventors: Kenny Nona, Linden (BE); Joachim Boydens, Zedelgem (BE); Brecht Vermeulen, Kortrijk (BE)

(73) Assignee: CNH Industrial America LLC, New Holland, PA (US)

( * ) Notice: Subject to any disclaimer, the term of this patent is extended or adjusted under 35 U.S.C. 154(b) by 676 days.

(21) Appl. No.: 17/876,974

(22) Filed: Jul. 29, 2022

(65) Prior Publication Data

US 2023/0032085 A1 Feb. 2, 2023

(30) Foreign Application Priority Data

Jul. 30, 2021 (EP) .................................... 21188847

(51) Int. Cl.
*A01F 15/08* (2006.01)
*A01F 15/04* (2006.01)
*G06Q 30/0283* (2023.01)
*G06Q 50/02* (2024.01)

(52) U.S. Cl.
CPC .......... *A01F 15/0825* (2013.01); *A01F 15/04* (2013.01); *G06Q 30/0283* (2013.01); *G06Q 50/02* (2013.01)

(58) Field of Classification Search
CPC ................................................ A01F 15/0825
See application file for complete search history.

(56) References Cited

U.S. PATENT DOCUMENTS

| 9,010,240 | B2 | 4/2015 | Missotten et al. |
| 9,791,863 | B2 | 10/2017 | Derscheid et al. |
| 10,098,283 | B2 | 10/2018 | Coen et al. |
| 2009/0217827 | A1 | 9/2009 | Duenwald et al. |
| 2013/0008324 | A1 | 1/2013 | Verhaeghe et al. |
| 2017/0287303 | A1* | 10/2017 | Lang ....................... A01F 15/08 |
| 2019/0266466 | A1 | 8/2019 | Hamilton et al. |
| 2019/0357442 | A1 | 11/2019 | Rosseel et al. |

(Continued)

FOREIGN PATENT DOCUMENTS

EP    3 228 180 A1    10/2017

OTHER PUBLICATIONS

Extended European Search Report dated Jan. 24, 2022 for European Patent Application No. 21188847.4 (8 pages).

*Primary Examiner* — Jared O Brown
(74) *Attorney, Agent, or Firm* — CM Law PLLC; Stephen J. Weed

(57) ABSTRACT

A method for determining a quality of an agricultural bale produced by an agricultural baler, the method comprising the steps of: receiving a first bale parameter signal indicative of a first bale parameter of the agricultural bale; receiving a second bale parameter signal indicative of a second bale parameter of the agricultural bale, wherein the first bale parameter and the second bale parameter each represents a different physical property of the agricultural bale; determining, based on the respective first bale parameter signal and the second bale parameter signal, a bale quality parameter indicative of a perceived quality of the agricultural bale; and providing an electronic signal representative of the bale quality parameter.

15 Claims, 3 Drawing Sheets

(56) References Cited

U.S. PATENT DOCUMENTS

2019/0364740 A1* 12/2019 Liefooghe ............ A01F 15/0825
2021/0116361 A1*  4/2021 Olander ................. A01F 15/08
2023/0034308 A1*  2/2023 Caddick ................. A01F 15/08
2023/0341322 A1* 10/2023 Hamilton ......... G06Q 10/06395

* cited by examiner

METHOD FOR DETERMINING A QUALITY OF AN AGRICULTURAL BALE

CROSS REFERENCE TO RELATED APPLICATIONS

This application claims priority to European patent application no. EP 21188847.4, entitled "METHOD FOR DETERMINING A QUALITY OF AN AGRICULTURAL BALE", filed Jul. 30, 2021, which is incorporated herein by reference.

FIELD OF THE INVENTION

The present invention relates to a method for determining a quality of an agricultural bale and to a method for controlling an agricultural baler in dependence of the determined quality of the agricultural bale. The present invention further relates to an agricultural baler using one of the methods according to the present invention, and to computer programs including instructions which, when executed by a computer, cause the computer to carry out these methods.

BACKGROUND OF THE INVENTION

Agricultural balers are used to consolidate and package crop material so as to facilitate the storage and handling of the crop material for later use. For example, when the crop is hay a mower-conditioner is typically used to cut and condition the crop material for windrow drying in the sun. As another example, when the crop is straw a combine harvester discharges non-grain crop material from the rear of the harvester defining the straw which is to be picked up by the baler. The cut crop material is usually dried, and a baler, such as a large square baler or round baler, straddles the windrows and travels along the windrows to pick up the crop material and form it into bales.

A round baler typically includes a variable or fixed diameter cylindrical bale chamber confined by a plurality of moving belts or rollers in which the bales are formed. When the bale has been completed, the bale chamber is opened and the completed bale is released onto the field.

A large square baler typically includes two main parts used in the formation of the bales, being a pre-compression chamber and a bale chamber. Crop material is gathered and pushed into the pre-compression chamber, where a slice of crop material is formed. The pre-compression chamber is linked to the bale chamber in such a manner that the slice of crop material is periodically transferred into the bale chamber. In the bale chamber, a plunger reciprocally moves, thereby pressing a square bale from subsequently fed slices. When the bale is completed, a piece of twine is wrapped around the bale and tied to keep the bale together. While a new bale is formed in the bale chamber, the completed bale is pushed to the rear of the bale chamber by this new bale. Eventually, the completed bale is pushed through an outlet at the rear of the bale chamber and dropped on the field behind the agricultural baler.

In practice, not all bales come out the same. A length of a square bale is determined by the number of slices that is used to form a bale, but also influenced by, e.g., crop type, crop humidity and the filling level of the pre-compression chamber when the crop slices are transferred into the bale chamber. If the filling of the pre-compression chamber varies per slice and/or if the gathered crop is not evenly distributed over the width of the pre-compression chamber, the shape of the resulting bale may deviate from a perfect rectangular box. Similarly, the eventual shape of a round (actually cylindrical) bale may depend on the width of the swath when being taken into the bale chamber.

Apart from the bale shape, also other parameters such as bale color, protein content, or moisture content and distribution may vary and can be important for determining the usefulness or market value of a bale. Currently, sensors and detection systems are available for monitoring many of such bale parameters. For example, US patent application no. 2009/0217827 A1 discloses measuring and storing a moisture content and a bale weight of each bale that is produced. Commonly, a measuring wheel is configured to rotate when a square bale is pushed through the bale chamber and a sensor measures the rotation of the measuring wheel to determine the bale length. As an alternative, U.S. Pat. No. 10,098,283 discloses an optical sensor, mounted to the bale chamber for measuring a total bale length. In U.S. Pat. No. 9,010,240, a 'bale quality' parameter is disclosed which represents a variation in an average filling level of the pre-compression chamber when the crop slices are transferred into the bale chamber. A lower variation in the average filling level results in a higher 'bale quality'.

All these known bale parameters may be stored together with an identification of the bale, to help the farmer precisely determine the economic value of each individual bale. However, this value can only be established after the bales have already been produced, and different bale parameters influence the economic value of the bales in different ways. During the production of the bales, one or more of the bale parameters may be displayed on a display in the driver cabin of the tractor pulling the agricultural baler. Based on the displayed parameter, the operator may then adjust one or more operating parameters, such as the driving speed of the tractor, in an attempt to improve the respective bale parameter for the subsequent bales to be produced. However, if the operator is interested in the values of two or more different bale parameters, it may be difficult to keep an eye on all of them while operating the tractor and the agricultural baler. Furthermore, attempts to optimize two or more different bale parameters simultaneously may lead to conflicting strategies for adjusting the operating parameters.

What is needed in the art is to address one or more disadvantages associated with the prior art.

SUMMARY OF THE INVENTION

According to an aspect of the present invention, the present invention provides a new method for determining a quality of an agricultural bale produced by an agricultural baler, the method including the steps of receiving a first bale parameter signal and a second bale parameter signal, determining a bale quality parameter, and providing an electronic signal representative of the bale quality parameter. The first and second bale parameter signals are indicative of a first and second bale parameter of the agricultural bale. The first and second bale parameters each represent a different physical property of the bale. The bale quality parameter is determined based on the respective bale parameter signals and is indicative of a perceived quality of the agricultural bale.

With the method of the present invention, the economic value of the bale can easily and accurately be determined based on the bale quality parameter. As a further advantage, this can already be done while driving on the field and producing the bales. More importantly, the bale quality parameter determined using the method of the invention provides a clear and direct indication of the perceived quality of the bales produced during the baling process. As a response thereto, the operator can adjust one or more operating parameters of the tractor and/or the agricultural baler and immediately observe the effect on the quality of the subsequently produced bales. Even though such an adjustment of one or more operating parameters may have different effects on different important bale parameters, the resulting bale quality parameter provides a clear indication of the overall effect of the adjustment on the quality of the bales. This makes it easier to control the tractor and the agricultural baler and to produce agricultural bales of optimal quality, thereby allowing the operator to pay more attention to other important tasks.

In embodiments of the method according to the invention, the first or second bale parameter represents one of a bale size, a bale shape, a bale weight, a bale color, a bale colur distribution, a slice thickness distribution, twine tension, twine integrity, protein content, protein content distribution, moisture content, or moisture content distribution. Two, three or more of these and other useful bale parameters may be used as a basis for determining the bale quality parameter. The bale quality parameter may, for example, be determined using a multi-dimensional lookup table or an algorithm using all obtained bale parameter values as input. Such an algorithm may include one or more weighting factors that can be adjusted by the operator in order to assign different priorities to different bale parameters.

It is noted that, while it is important for the method according to the invention that the first and second bale parameters each represent a different physical property of the bale, this does not necessarily mean that they need to be measured using two physically separated sensors. A single sensor may thus embody both the first and the second bale parameter sensors and a single signal may include information from which both bale parameters can be derived. For example, a video signal from a video camera may be used for measuring a bale size (first bale parameter) and a bale rectangularity (second bale parameter).

In embodiments of the present invention, the first bale parameter signal is received from a first bale parameter sensor and the second bale parameter signal is received from a second bale parameter sensor. The first and second bale parameter sensors may be different sensors.

Optionally, the method according to the present invention further includes a step of showing a textual and/or graphical representation of the bale quality parameter on a display. Alternatively, or additionally, the bale quality parameter may be communicated to the operator using an analogue indicator, a series of LEDs, as an audible signal, or in any other suitable way. If the controller is configured to automatically optimize the operating parameters of the tractor and/or agricultural baler in dependence of the determined bale quality parameter, or if the bale quality parameter is only used for recording the perceived bale quality of each bale, then the bale quality parameter may not need to be communicated to the operator at all.

An embodiment of the method according to the present invention may include a step of estimating a cost parameter indicative of an amount of work required for manufacturing of the agricultural bale. The estimated cost parameter may be used as input for determining the bale quality parameter, e.g., by attributing a lower bale quality to a bale that has a higher cost parameter. Alternatively, the cost parameter and/or individual parameters contributing to the cost parameter may be displayed together with the bale quality parameter to allow the operator to find a nice balance between bale cost and bale quality.

The cost parameter may, for example, depend on a fuel consumption of the agricultural baler during production of the agricultural bale. The fuel consumption of the agricultural baler is considered to include, and typically consists of, the fuel consumed by the tractor for driving the tractor over the field and driving the rotation of a PTO that drives the agricultural baler. Additionally, or alternatively, the cost parameter may depend on a peak load or torque on a moving part of the agricultural baler during production of the agricultural bale. Such peak loads or torques are indications of the amount of wear to be expected for those moving parts because of the forming of the agricultural bale. Higher peak loads and torques mean that fewer agricultural bales can be produced before maintenance or replacements of such parts is needed.

In an optional embodiment, the controller further receives a location signal from a location sensor, such as a GPS sensor, the location signal being indicative of a drop-off location of the agricultural bale when it is released from the agricultural baler. The bale quality parameter is then stored in a memory in association with the drop-off location. As a result, it becomes possible to draw a map indicating how bale quality may vary over a field, which information may, for example, be useful for planning future tillage and planting decisions.

According to a further aspect of the present invention, a computer program is provided including instructions which, when executed by a computer, cause the computer to carry out a method as described above.

According to a further aspect of the present invention, a system is provided for determining a quality of an agricultural bale. According to yet another aspect of the invention, an agricultural baler is provided including such a system. The system includes at least a first bale parameter sensor, a second bale parameter sensor and a controller. The first bale parameter sensor is configured for measuring a first bale parameter of the agricultural bale. The second bale parameter sensor is configured for measuring a second bale parameter of the agricultural bale. The first and second bale parameters each represent a different physical property of the bale. The controller is operatively coupled to the first and the second bale parameter sensors and configured to perform a method as described above. The system may further include a display, operatively coupled to the controller to receive an electronic signal representative of a bale quality parameter and configured to show a textual and/or graphical representation of the bale quality parameter on the display.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
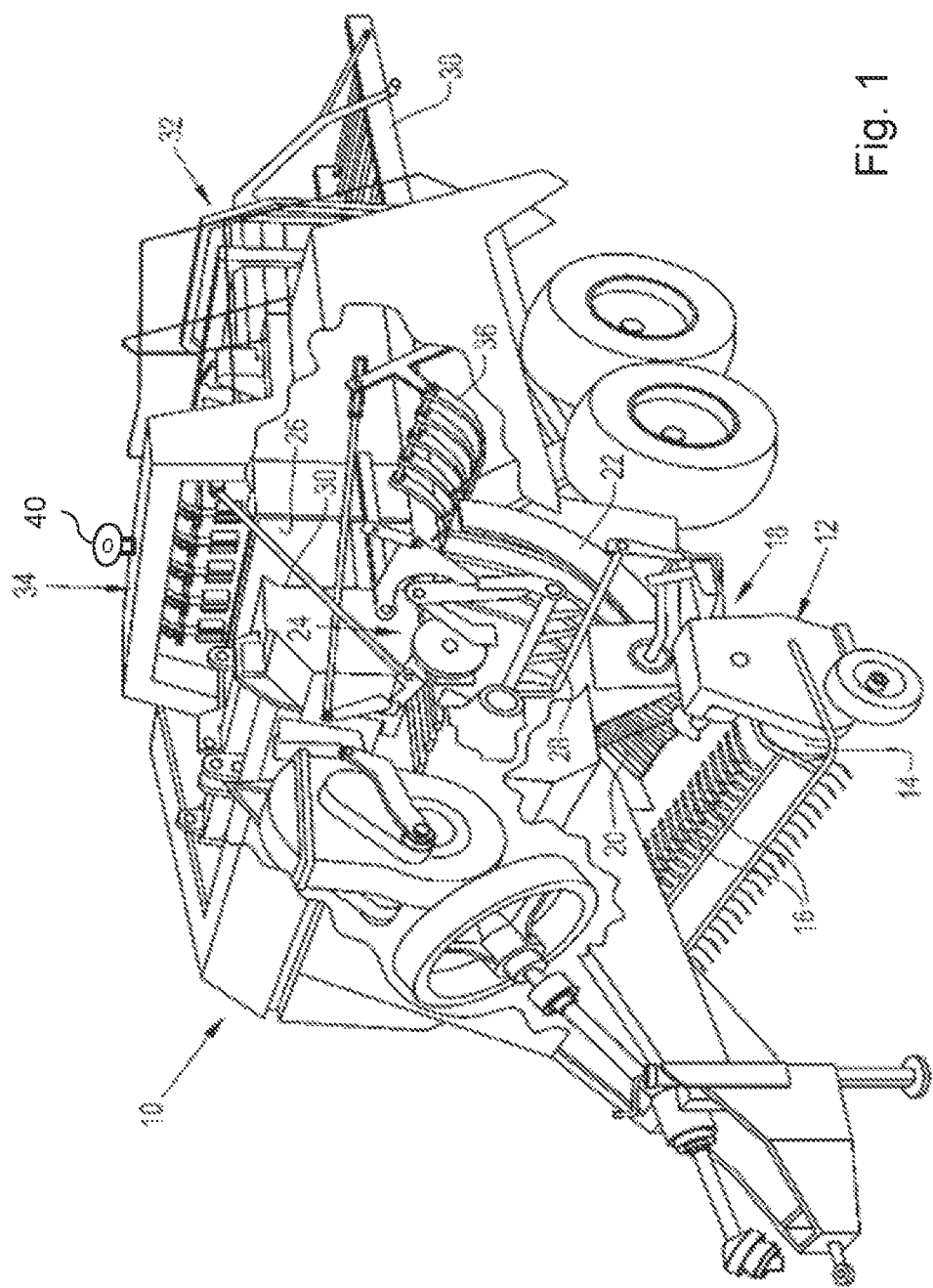
FIG. 1 shows a perspective cutaway view of an agricultural baler wherein the invention may be used.

FIG. 1 shows an agricultural baler 10 in the form of a large square baler. The baler 10 has a pickup unit or apparatus 12 for lifting crop material from windrows. The pickup apparatus 12 has a rotatable pickup roll (or rotor or cylinder) 14 with a plurality of pickup tines 16 to move the collected crop rearward towards a rotor cutter apparatus 18. Optionally, a pair of stub augers (one of which is shown, but not numbered) is positioned above the pickup roll 14 to move the crop material laterally inward.

The rotor cutter apparatus 18 has a rotor assembly with rotor tines 20 that push the crop towards a knife rack with knives for cutting the crop and into a pre-compression chamber 22 to form a slice of crop material. The tines 20 intertwine the crop together and pack the crop within the pre-compression chamber 22. The pre-compression chamber 22 and the rotor assembly with the tines 20 function as a first stage for crop compression.

Once the pressure in the pre-compression chamber 22 reaches a predetermined sensed value, a stuffer unit or apparatus 24 moves the slice of crop from the pre-compression chamber 22 to a bale chamber 26. The stuffer apparatus 24 includes stuffer forks 28 which push the slice of crop directly in front of a plunger 30, which reciprocates within the bale chamber 26 and compresses the slice of crop into a flake. The stuffer forks 28 return to their original state after the slice of material has been moved into the bale chamber 26. The plunger 30 compresses the slices of crop into flakes to form a bale and, at the same time, gradually advances the bale toward an outlet 32 of the bale chamber 26. The bale chamber 26 and plunger 30 function as a second stage for crop compression.

When enough flakes have been added and the bale reaches a full (or other predetermined) size, the knotters 34 are actuated which wrap and tie twine around the bale while it is still in the bale chamber 26. Needles 36 bring the lower twine up to the knotters 34 and the tying process then takes place. The twine is cut, and the formed bale is ejected from a discharge chute 38 as a new bale is formed.

A camera 40 may be installed on the agricultural baler 10 at a position and orientation that allows it to capture a series of bale images including a view of the outlet 32 of the bale chamber 26 and the bale that is ejected therefrom. Other cameras may be places in different locations. The cameras 40 may, e.g., be 2D or 3D photo or video cameras. Infrared cameras, radar, lidar, and ultrasonic sensors may be installed for detecting shapes, colors and/or temperatures of the bales leaving the bale chamber outlet.

Figure 2:
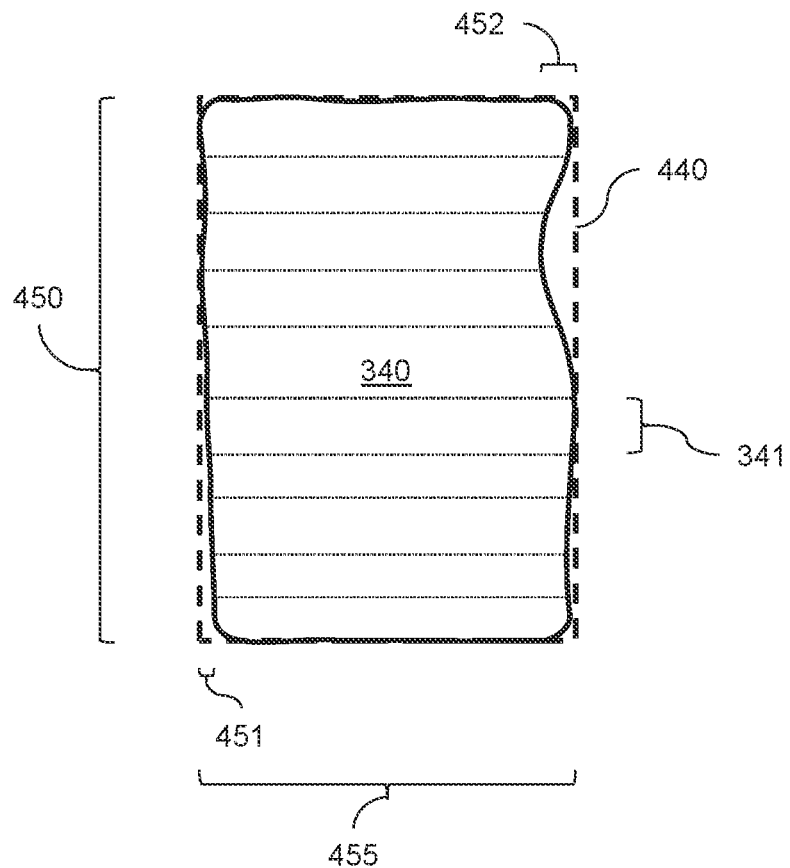
FIG. 2 shows a schematic representation of a top view on an agricultural bale.

FIG. 2 shows a schematic representation of a top view on an agricultural bale 340. In this top view, some of the relevant bale shape parameters that may be taken into account when determining the bale quality parameter are identified. A bale length 450 is defined by a distance between the leading and the trailing edge of the bale 340. A bale width 455 will typically be defined by the width of the bale chamber 26 but may be measured too. As can be seen in this drawing, the bale width 455 may vary along the length of the bale. The lower the bale width variation, the higher the bale quality.

As described above, the bale 340 is built from a series of slices of compacted crop. While the bale 340 is being produced, a sensor may measure a slice thickness 341 of each slice. Slice thickness 341 and slice thickness variation may be used as input for determining the bale quality parameter too. Slice thickness 341 may, e.g., be determined using a traditional star wheel or some camera solution to measure the displacement of the bale 340 when a slice is added to its trailing edge.

A rectangularity of the identified bale 340 may, e.g., be determined by establishing the surface area that is inside the bounding box 440 but do not form part of the bale 340 and dividing this surface area by the total surface area of the bounding box 440. A different measure of rectangularity or non-rectangularity may be a skew parameter 451, defining how far one of the corners of the top surface is displaced from the corresponding corner of the bounding box 440. An indent parameter 452 may indicate the largest distance of any edge of the top surface to the corresponding edge of the bounding box 440. Other useful parameters for classifying the shape or rectangularity of the bale 340 may be used.

Figure 3:
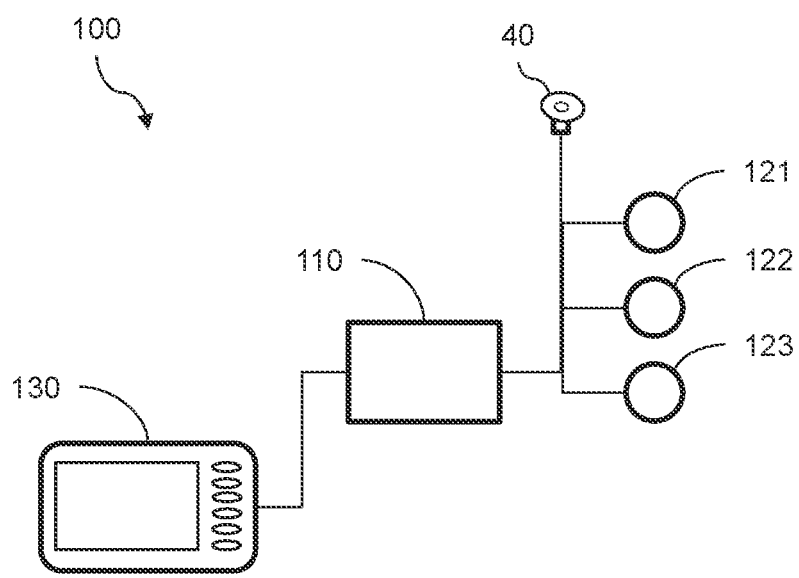
FIG. 3 schematically shows a system according to an embodiment of the invention.

FIG. 3 schematically shows a system 100 according to an embodiment of the present invention. The system includes a controller 110, configured to receive input signals from a plurality of sensors 40, 121, 122, 123, and to provide output signals to, e.g., a display screen 130. Typically, the controller 110 and the display screen 130 are located on the tractor pulling and powering the agricultural baler 10, while most of the sensors 121, 122, 123 are part of the agricultural baler 10. Some sensors, such as a GPS sensor for measuring a location of the tractor, the agricultural baler 10, and the bale 340, may be located at the tractor too. Alternatively, an unmanned aerial vehicle (UAV, aka drone) may follow the agricultural baler and have an on-board camera for taking images of the bale 340 from which relevant bale parameters can be derived.

At least one of the sensors may be a camera 40. The cameras 40 may, e.g., be 2D or 3D photo or video cameras. Infrared cameras, radar, lidar, and ultrasonic sensors may be installed for detecting shapes, colors and/or temperatures of the bales 340 leaving the bale chamber outlet. Other sensors 121, 122, 123 that may be useful for determining relevant bale parameters that can be used for determining a bale quality parameter include, but are not limited to, moisture sensors, protein content sensors, bale weight sensors, or twine tension sensors. Such sensors may, e.g., be incorporated in a wall of the bale chamber 26, in a knotter system 34, near the outlet 32 of the bale chamber 26 or in a floor of the discharge chute 38.

It is noted that some of the controller functionality may be distributed over multiple controllers 110 located at different locations. For example, the sensors 121, 122, 123 may include some pre-processing capabilities. Signals from a camera 40 will typically be analyzed by a separate controller 110 for determining the relevant bale parameters. A controller on board the tractor may calculate the bale quality parameter based on sensor data received from the camera 40 and sensors 121, 122, 123 or may just receive a calculated bale quality parameter from a processor on the agricultural baler 10.

While the tractor and agricultural baler 10 move over the field, the agricultural baler 10 picks up the crop lying on this field and uses it to produces bales 340. According to the invention, a camera 40 and/or one or more sensors 121, 122, 123 measure relevant parameters of the bales 340 that are being formed. These measurements may take place while the bale 340 is being formed, after the bale 340 has been completed when leaving the outlet 32 of the bale chamber 26 or positioned on the bale chute 38, or even after the bale 340 has already been dropped onto the field behind the agricultural baler 10. Based on the measured bale parameters, at least two of which represent different physical properties of the bale 340, a bale quality parameter is calculated. The calculated bale quality parameter may then, e.g., be displayed on the display screen 130 and/or used for automatically adapting relevant operating parameters of the tractor or the agricultural baler 10.

With the method of the invention, the economic value of the bale 340 can easily and accurately be determined based on the bale quality parameter. As a further advantage, this can already be done while driving on the field and producing the bales. More importantly, the bale quality parameter determined using the method of the present invention provides a clear and direct indication of the perceived quality of the bales 340 produced during the baling process. As a response thereto, the operator can adjust one or more operating parameters of the tractor and/or the agricultural baler 10 and immediately observe the effect on the quality of the subsequently produced bales 340. Even though such an adjustment of one or more operating parameters may have different effects on different important bale parameters, the resulting bale quality parameter provides a clear indication of the overall effect of the adjustment on the quality of the bales 340. This makes it easier to control the tractor and the agricultural baler 10 and to produce agricultural bales 340 of optimal quality, thereby allowing the operator to pay more attention to other important tasks.

It is again noted that, while it is important for the method according to the present invention that the first and second bale parameters each represent a different physical property of the bale 340, this does not necessarily mean that they need to be measured using two physically separated sensors 40, 121, 122, 123. For example, a video signal from a video camera 40 may be used for measuring a bale size, a bale rectangularity, and many other important bale parameters.

In embodiments of the method according to the present invention, the first or second bale parameter represents one of a bale size, a bale shape, a bale weight, a bale color, a bale color distribution, a slice thickness distribution, twine tension, twine integrity, protein content, protein content distribution, moisture content, or moisture content distribution. Two, three or more of these and other useful bale parameters are used as a basis for determining the bale quality parameter. The bale quality parameter may, for example, be determined using a multi-dimensional lookup table or an algorithm using all obtained bale parameter values as input. Such an algorithm may include one or more weighting factors that can be adjusted by the operator in order to assign different priorities to different bale parameters.

Optionally, the method according to the invention further includes a step of showing a textual and/or graphical representation of the bale quality parameter on a display 130. Alternatively, or additionally, the bale quality parameter may be communicated to the operator using an analogue indicator, a series of LEDs, as an audible signal, or in any other suitable way. If the controller 110 is configured to automatically optimize the operating parameters of the tractor and/or agricultural baler 10 in dependence of the determined bale quality parameter, or if the bale quality parameter is only used for recording the perceived bale quality of each bale 340, then the bale quality parameter may not need to be communicated to the operator at all.

An embodiment of the method according to the present invention may include a step of estimating a cost parameter indicative of an amount of work required for manufacturing of the agricultural bale. The estimated cost parameter may be used as input for determining the bale quality parameter, e.g., by attributing a lower bale quality to a bale that has a higher cost parameter. Alternatively, the cost parameter and/or individual parameters contributing to the cost parameter may be displayed together with the bale quality parameter to allow the operator to find a nice balance between bale cost and bale quality.

The cost parameter may, for example, depend on a fuel consumption of the agricultural baler 10 during production of the agricultural bale. The fuel consumption of the agricultural baler 10 is considered to include, and typically consists of, the fuel consumed by the tractor for driving the tractor over the field and driving the rotation of a PTO that drives the agricultural baler 10.

Additionally, or alternatively, the cost parameter may depend on a peak load or torque on a moving part of the agricultural baler 10 during production of the agricultural bale. Such peak loads or torques are indications of the amount of wear to be expected for those moving parts because of the forming of the agricultural bale. Higher peak loads and torques mean that fewer agricultural bales can be produced before maintenance or replacements of such parts is needed. Other useful parameters that may be taken into account for calculating a cost parameter are, for example, the time needed for making the bale or twine usage.

In an optional embodiment, at least one of the sensors 121, 122, 123 used is a location sensor, such as a GPS sensor. The GPS sensor is used to determine a drop-off location of the agricultural bale 340 when it is released from the agricultural baler 10. The bale quality parameter is then stored in a memory in association with the drop-off location. As a result, it becomes possible to draw a map indicating how bale quality may vary over a field, which information may, for example, be useful for planning future tillage and planting decisions.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A method for determining a quality of an agricultural bale produced by an agricultural baler, the method comprising the steps of:
   receiving a first bale parameter signal indicative of a first bale parameter of the agricultural bale from a first bale parameter sensor of the agricultural baler;
   receiving a second bale parameter signal indicative of a second bale parameter of the agricultural bale from a second bale parameter sensor of the agricultural baler, wherein the first bale parameter and the second bale parameter each represents a different physical property of the agricultural bale and are selected from a group consisting of a bale size, a bale shape, a bale weight, a bale color a bale color distribution, a slice thickness distribution, a twine tension a twine integrity, a protein content, a protein content distribution, a moisture content, and a moisture content distribution, at least one of the first bale parameter or the second bale parameter received during formation of the agricultural bale;
   determining, based on the first bale parameter signal and the second bale parameter signal, a bale quality parameter indicative of the quality of the agricultural bale using a multi-dimensional lookup table or an algorithm with the first bale parameter signal from the first bale parameter sensor and the second bale parameter signal from the second bale parameter sensor as inputs;

providing an electronic signal representative of the bale quality parameter; and presenting at least one of a textual representation and a graphical representation of the bale quality parameter on a display of the agricultural baler; and adjusting a speed of the agricultural baler in dependence on the bale quality parameter.

2. The method according to claim 1, wherein the first bale parameter sensor and the second bale parameter sensor are different from one another.

3. The method according to claim 1, further comprising a step of estimating a cost parameter indicative of an amount of work required for manufacturing the agricultural bale.

4. The method according to claim 3, wherein the cost parameter depends on at least one of:
- a fuel consumption of the agricultural baler during production of the agricultural bale;
- a peak load on a moving part of the agricultural baler during production of the agricultural bale; and
- a peak torque on a moving part of the agricultural baler during production of the agricultural bale.

5. The method according to claim 1, further comprising a step of receiving a location signal from a location sensor, the location signal being indicative of a drop-off location of the agricultural bale when it is released from the agricultural baler, and a step of storing the bale quality parameter in association with the drop-off location.

6. A system configured for use with an agricultural baler and for determining a quality of an agricultural bale, the system comprising:
- a first bale parameter sensor configured for measuring a first bale parameter of the agricultural bale;
- a second bale parameter sensor configured for measuring a second bale parameter of the agricultural bale;
- a display; and
- a controller operatively coupled to the display, the first bale parameter sensor, and the second bale parameter sensor and configured to perform a method for determining the quality of the agricultural bale produced by an agricultural baler, the method comprising the steps of:
  - receiving a first bale parameter signal indicative of the first bale parameter of the agricultural bale;
  - receiving a second bale parameter signal indicative of the second bale parameter of the agricultural bale, the first bale parameter and the second bale parameter each representing a different physical property of the agricultural bale and are selected from a group consisting of a bale size, a bale shape, a bale weight, a bale color, a bale color distribution, a slice thickness distribution, a twine tension, a twine integrity, a protein content, a protein content distribution, a moisture content, and a moisture content distribution, at least one of the first bale parameter or the second bale parameter received during formation of the agricultural bale;
  - determining, based on the first bale parameter signal and the second bale parameter signal, a bale quality parameter indicative of the quality of the agricultural bale quality using a multi-dimensional lookup table or an algorithm with the first bale parameter signal from the first bale parameter sensor and the second bale parameter signal from the second bale parameter sensor as inputs;
  - providing an electronic signal representative of the bale quality parameter; and
  - presenting at least one of a textual representation and a graphical representation of the bale quality parameter on the display; and
  - adjusting a speed of the agricultural baler in dependence on the bale quality parameter.

7. The system according to claim 6, further comprising a computer program product comprising a plurality of instructions executable by a computer forming the controller, the plurality of instructions, when executed by the computer, causing the computer to carry out the method.

8. An agricultural baler, comprising: a bale chamber for producing an agricultural bale
- a system for determining a quality of an agricultural bale, the system comprising:
  - a first bale parameter sensor configured for measuring a first bale parameter of the agricultural bale;
  - a second bale parameter sensor configured for measuring a second bale parameter of the agricultural bale, the first bale parameter and the second bale parameter each representing a different physical property of the agricultural bale and are selected from a group consisting of a bale size, a bale shape, a bale weight, a bale color, a bale color distribution, a slice thickness distribution, a twine tension, a twine integrity, a protein content, a protein content distribution, a moisture content, and a moisture content distribution, at least one of the first bale parameter or the second bale parameter received during formation of the agricultural bale;
  - a controller operatively coupled to the first bale parameter sensor and the second bale parameter sensor and configured to perform a method for determining the quality of the agricultural bale produced by the agricultural baler, the method comprising the steps of:
    - receiving a first bale parameter signal indicative of the first bale parameter of the agricultural bale;
    - receiving a second bale parameter signal indicative of the second bale parameter of the agricultural bale;
    - determining, based on the first bale parameter signal and the second bale parameter signal, a bale quality parameter indicative of the quality of the agricultural bale using a multi-dimensional lookup table or an algorithm with the first bale parameter signal from the first bale parameter sensor and the second bale parameter signal from the second bale parameter sensor as inputs;
    - providing an electronic signal representative of the bale quality parameter; and
    - adjusting a speed of the agricultural the bale quality parameter; and
  - a display operatively coupled to the controller to receive the electronic signal representative of the bale quality parameter and configured to show at least one of a textual representation and a graphical representation of the bale quality parameter on the display.

9. The agricultural baler according to claim 8, wherein the agricultural baler is a square baler.

10. The method according to claim 1, wherein the agricultural bale comprises a plurality of slices, wherein a first bale parameter of the agricultural bale is a thickness of at least one of the plurality of slices, and wherein the method further comprises:
- measuring the thickness of the at least one of the plurality of slices during formation of the agricultural bale.

11. The method according to claim 10, wherein the method further comprises:
receiving a weighting factor for at least one of the first bale parameter or the second bale parameter from an operator of the agricultural baler;
wherein the determining of the bale quality parameter is further based on the weighting factor.

12. The system according to claim 6, wherein the agricultural bale comprises a plurality of slices, wherein a first bale parameter of the agricultural bale is a thickness of at least one of the plurality of slices, and wherein the method further comprises:
measuring the thickness of the at least one of the plurality of slices during formation of the agricultural bale.

13. The system according to claim 12, wherein the method further comprises:
receiving a weighting factor for at least one of the first bale parameter or the second bale parameter from an operator of the agricultural baler;
wherein the determining of the bale quality parameter is further based on the weighting factor.

14. The agricultural baler according to claim 8, wherein the agricultural bale comprises a plurality of slices, wherein a first bale parameter of the agricultural bale is a thickness of at least one of the plurality of slices, and wherein the method further comprises:
measuring the thickness of the at least one of the plurality of slices during formation of the agricultural bale.

15. The agricultural baler according to claim 14, wherein the method further comprises:
receiving a weighting factor for at least one of the first bale parameter or the second bale parameter from an operator of the agricultural baler;
wherein the determining of the bale quality parameter is further based on the weighting factor.

* * * * *